United States Patent
Spence et al.

(10) Patent No.: US 10,277,756 B2
(45) Date of Patent: Apr. 30, 2019

(54) APPARATUS AND METHOD FOR OVERCOATING A RENDERED PRINT

(71) Applicant: Xerox Corporation, Norwalk, CT (US)

(72) Inventors: James J. Spence, Honeoye Falls, NY (US); Wayne A. Buchar, Bloomfield, NY (US); Joseph F. Casey, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/716,569

(22) Filed: Sep. 27, 2017

(65) Prior Publication Data

US 2019/0098147 A1  Mar. 28, 2019

(51) Int. Cl.

| G06F 3/12 | (2006.01) |
|---|---|
| H04N 1/00 | (2006.01) |
| H04N 1/60 | (2006.01) |
| G03G 15/01 | (2006.01) |
| B41J 11/00 | (2006.01) |
| C09D 11/101 | (2014.01) |

(52) U.S. Cl.
CPC ........ *H04N 1/00233* (2013.01); *B41J 11/002* (2013.01); *G03G 15/0157* (2013.01); *H04N 1/00005* (2013.01); *H04N 1/603* (2013.01); *B65H 2801/15* (2013.01); *C09D 11/101* (2013.01); *G03G 2215/00801* (2013.01)

(58) Field of Classification Search
CPC .......... H04N 1/00233; H04N 1/00005; H04N 1/603; B41J 11/002; G03G 15/0157; G03G 2215/00801; B65H 2801/15; C09D 11/101
USPC ......................................... 358/1.1–1.18, 474
See application file for complete search history.

(56) References Cited

U.S. PATENT DOCUMENTS

| 5,473,351 A | 12/1995 | Helterline et al. |
|---|---|---|
| 6,025,926 A | 2/2000 | Smith et al. |
| 7,212,772 B2 | 5/2007 | Kasiske et al. |
| 7,690,782 B2 | 4/2010 | Odell |
| 7,925,043 B2 | 4/2011 | Kazmaier et al. |
| 8,251,504 B2 | 8/2012 | Viturro et al. |
| 8,287,081 B2 | 10/2012 | Larson et al. |
| 8,303,071 B2 | 11/2012 | Eun |
| 8,313,163 B2 | 11/2012 | Eun et al. |
| 8,449,102 B2 | 5/2013 | Breton et al. |
| 8,469,476 B2 | 6/2013 | Mandel et al. |
| 8,529,007 B2 | 9/2013 | Folkins et al. |
| 8,614,806 B2 | 12/2013 | Brewington |

(Continued)

FOREIGN PATENT DOCUMENTS

JP   2010125798   6/2010

OTHER PUBLICATIONS

Xerox Color 800/1000 Presses Overview (2012).

*Primary Examiner* — Gabriel I Garcia
(74) *Attorney, Agent, or Firm* — Michael J. Nickerson; Basch & Nickerson LLP

(57) ABSTRACT

An apparatus and process overcoats a rendered image on a substrate with a liquid material. The apparatus includes a scanning device and a marking module aligned with the scanning device. The scanning device is used to scan the substrate including the rendered image to acquire scan data. A movable transport member moves the scanned substrate including the rendered image to a location underneath the marking subsystem. A controller uses registration and image data, generated from the scan data, to overcoat the rendered image on the substrate.

19 Claims, 8 Drawing Sheets

(56) References Cited

U.S. PATENT DOCUMENTS

| | | | |
|---|---|---|---|
| 8,651,656 B2 | 2/2014 | Roof et al. | |
| 8,657,435 B2 | 2/2014 | Usuda et al. | |
| 8,758,865 B2 | 2/2014 | Belelie et al. | |
| 8,697,194 B2 | 4/2014 | Odell et al. | |
| 8,711,439 B2 | 4/2014 | Nacman et al. | |
| 8,916,084 B2 | 12/2014 | Chretien et al. | |
| 9,533,497 B2 | 1/2017 | Roof et al. | |
| 2004/0029030 A1 | 2/2004 | Murray | |
| 2007/0206083 A1* | 9/2007 | Hoshino | B41J 11/002 347/102 |
| 2010/0123752 A1 | 5/2010 | Eun et al. | |
| 2012/0098879 A1 | 4/2012 | Mandrel et al. | |
| 2012/0123014 A1 | 5/2012 | Chretien et al. | |
| 2013/0021398 A1* | 1/2013 | Mizes | B41J 2/2114 347/14 |

\* cited by examiner

APPARATUS AND METHOD FOR OVERCOATING A RENDERED PRINT

BACKGROUND

Prints having a toner or ink overcoat, particularly a clear overcoat, are often desired for such printed products as business cards, invitations, and placards due to their aesthetically pleasing texture. Also, such prints are often equated with high-quality and luxury. Several approaches for overcoating images with clear toner or ink, including "thermography" or "thermographic printing," have been developed.

In one example of thermographic printing, a base image on media is purposely left uncured or fused, creating a "wet" surface on the image serving as a tacking layer. As the process proceeds, a powder or dry substrate is applied to the "wet" surface of the image, resulting in the powder adhering to the image. A vacuum process is applied to remove any loose or residual powder off the media surface. The media, with the image thereon, is then transferred into a heating apparatus (such as an oven) where a transition occurs. The dry powder is turned into a molten state and is allowed to cure and solidify. The end result is a raised textured surface mapped over the image known as a thermographic print.

Thermographic printing is a cumbersome, hardware intensive process, requiring numerous operational steps to produce a thermographic image. This results in run costs that are considerably higher than those encountered in digital printing. High cost is attributable to, among other things, the lack of inline printing operations, the high demand for skilled labor and energy, as well as the need for multiple machines.

Another approach for overcoating can be found in xerographic printers employing clear toner. For instance, U.S. Pat. No. 7,212,772 discloses an electrophotographic printer configured to print a three-dimensional texture on a substrate by applying clear toner in locations corresponding to where texture is desired. The clear toner for texture may be applied either after, or before, other colors (e.g., CMYK) are applied to the substrate.

An electrophotographic printing system may include a front-end station for scanning a document coupled to an electrophotographic printer to permit an operator to add texture during the reproduction of the scanned document.

Although the xerographic print system discussed above with respect to U.S. Pat. No. 7,212,772 provides a process for adding texture to a xerographic print, U.S. Pat. No. 7,212,772 does not add texture to a pre-existing, rendered print, wherein a rendered print typically includes either (1) a rendered xerographic print, the rendered xerographic print being a substrate having toner, forming an image, fused thereon, or (2) a rendered ink print, the rendered ink print being a substrate having ink, forming an image; dried thereon.

Therefore, it is desirable to provide a printing system that enables the addition of texture to a pre-existing, rendered print.

BRIEF DESCRIPTION OF THE DRAWINGS

The drawings are only for purposes of illustrating various embodiments and are not to be construed as limiting, wherein.

DETAILED DESCRIPTION OF THE DRAWINGS

Figure 1:
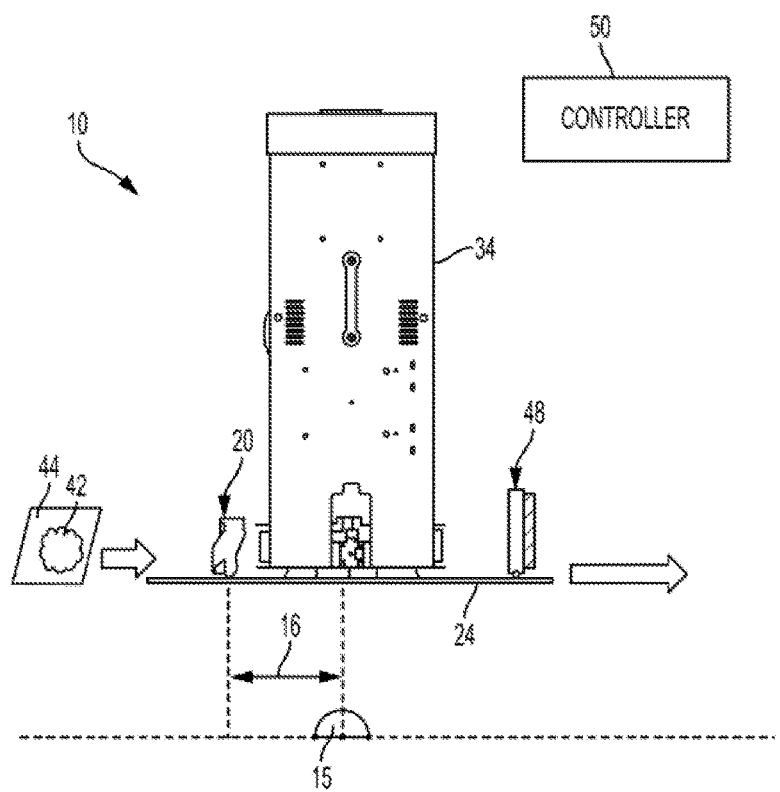
FIG. 1 is a schematic, planar view of a printing system for overcoating of a rendered print.

For a general understanding, reference is made to the drawings. In the drawings, in some instances, like references have been used throughout to designate identical or equivalent elements. It is also noted that the drawings may not have been drawn to scale and that certain regions may have been purposely drawn disproportionately so that the features and concepts may be properly illustrated.

In the description below, a rendered print is a rendered xerographic print or a rendered inked print.

With respect to a rendered xerographic print; a rendered xerographic print is a substrate having toner, wherein the area where the toner is located on and fused to the substrate is a rendered image. It is noted that the visually perceived image may be a combination of the substrate and the rendered image, formed by the toner fused to the substrate, wherein the substrate is part of the visually perceived image.

With respect to a rendered inked print, a rendered ink print is a substrate having ink, wherein the area where the ink is located and dried or bonded on a substrate is a rendered image. The ink may be applied to the substrate by a printer or by a pen or quill. It is noted that the visually perceived image may be a combination of the substrate and rendered image, formed by the ink dried or bonded on the substrate, wherein the substrate is part of the visually perceived image.

FIG. 1 illustrates a modular marking subsystem 10. The modular marking subsystem 10 of FIG. 1 is shown, for convenience of viewing, without a housing, or other components typically employed to support a typical printing module.

As contemplated, the modular marking subsystem 10 can be employed as either an inline module, finding exemplary use with either a xerographic or inkjet based printing system, or as a standalone system.

In one exemplary implementation, documents or substrates 44 with a rendered image 42 thereon can be delivered to the modular marking subsystem 10 by way of a direct output from a printing system or an inserter.

As illustrated in FIG. 1, an image detection bar 20 may comprise a full width array scanner for generating scan data from a document 44 being scanned therewith.

In one embodiment, the image detection bar 20 is positioned above an document path 24, the document path 24 may include a conveyor belt (not shown). The conveyor belt, the significance of which is described in further detail below, may be driven in the direction of arrows 26 by a conventional arrangement of rollers and a motor (not shown).

Down-path from the full width array scanner 20, as shown in FIG. 1, is a print bar marking module 34.

In one embodiment, the print bar marking module 34 can be configured as a print head array communicating, with a supply of overcoating ink (not shown).

As will be appreciated by those skilled in the art of two-dimensional and three-dimensional inkjet printing, while only one print bar marking module is shown in FIG. 1, various effects and advantages, particularly in the area of textured printing, could be obtained by positioning two or more print bar marking modules above the document path 24.

In one exemplary implementation, the overcoating ink is a liquid ink when being applied to (jetted onto) the documents or substrates 44 with a rendered image 42 thereon.

It is noted that the overcoating ink may comprise an ultra-violet (UV) curable gel ink. The UV curable gel ink may be heated before being ejected by the inkjet ejectors of the print head.

As used herein, a liquid ink refers to a phase change ink, a melted solid ink, heated gel ink, or other known forms of ink, such as aqueous inks, ink emulsions, ink suspensions, ink solutions, or the like.

An example of an UV curable overprint varnish (ink) suitable for use with print bar marking module 34 is disclosed in U.S. Patent Application Publication Number 2012/0123014.

Moreover, the UV curable overprint varnish (ink) formulations may comprise a varnish (ink) vehicle of at least one of a monomer or an oligomer, and a wetting additive. The wetting additive has an affinity for both the varnish (ink) vehicle, which may be primarily acrylate, and the fuser oil, which may be amino-functionalized silicone oil.

Other embodiments may also comprise, for example, a curable amide gellant phase change agent, a wax, a photoinitiator, a stabilizer, or other additives.

As noted above, the UV curable overprint varnish (ink) formulations may comprise phase change agents, including curable amide gellant phase change agents.

"Phase change agent" refers to an additive that functions to increase the viscosity of the overprint varnish (ink) composition within a desired temperature range. In particular, the gelling agent forms a solid-like gel in the overprint varnish (ink) formulations at temperatures below the gel point of the gelling agent, for example, below the temperature at which the overprint varnish (ink) composition is jetted.

The gel phase typically comprises a solid-like phase and a liquid phase in coexistence; wherein the solid-like phase forms a three-dimensional network structure throughout the phase and prevents the liquid phase from flowing at a macroscopic level.

The overprint varnish (ink) formulations exhibit a thermally reversible transition between the gel state and the liquid state when the temperature is varied above or below the gel point of the overprint varnish (ink) composition. This cycle of gel reformation can be repeated a number of times, since the gel is formed by physical; non-covalent interactions between the gelling agent molecules.

Gellants suitable for use in the radiation curable overprint varnish (ink) formulations include a curable gellant comprised of a curable polyamide-epoxy acrylate component and a polyamide component, a curable composite gellant comprised of a curable epoxy resin and a polyamide resin, amide gellants and the like.

Inclusion of the gellant in the overprint varnish (ink) composition described herein permits the overprint varnish (ink) composition to coat a substrate (with or without an image thereon), without excessive penetration into the substrate because the viscosity of the overprint varnish (ink) composition is quickly increased as the overprint varnish composition cools.

Excessive penetration of a liquid into a porous substrate such as paper can lead to an undesirable decrease in the substrate opacity. The curable gellant participates in the curing of the monomer(s) described herein. The increase in viscosity by including the gellant may also reduce the diffusion of oxygen into the overprint varnish (ink) because oxygen is an inhibitor of free radical polymerization.

The gellants suitable for use in the overprint varnish (ink) formulations described herein may be amphiphilic in nature in order to improve wetting when the overprint varnish (ink) composition is utilized over a substrate having silicone oil thereon. As used herein, amphiphilic refers to molecules that have both polar and non-polar parts of the molecule. For example, the gellants described herein may have long non-polar hydrocarbon chains and polar amide linkages.

Figure 2:
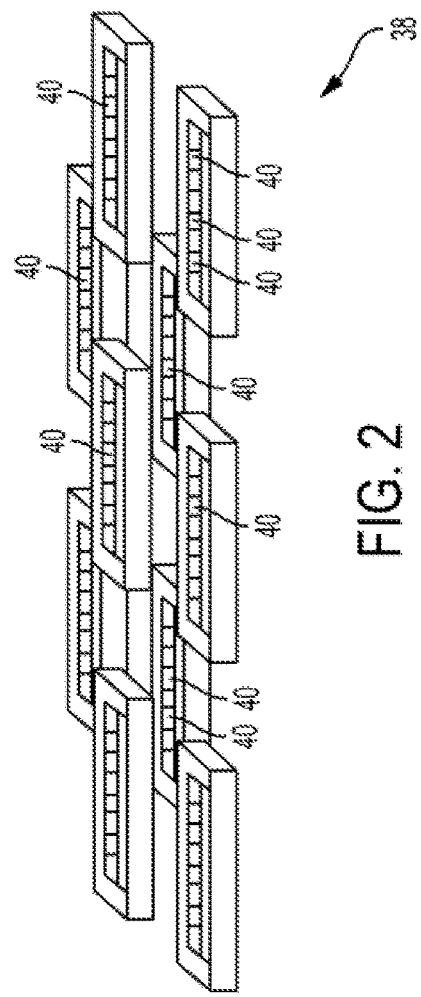
FIG. 2 is a schematic, perspective view of several print heads used in the printing system of FIG. 1

As illustrated in FIG. 2, an exemplary arrangement of print heads 38 suitable for use with print bar marking module or print array 34. The print head 38 include print nozzles 40 distributed across a bottom of the print heads in one or more arrays.

As discussed in further detail below, clear or substantially clear ink, examples of which are described above, can be selectively ejected from selected ones of the print nozzles 40 for overcoating the rendered image 42 on a document or substrate 44 (FIG. 1). The print heads 38 include arrays of print nozzles 40 of sufficient size and density to suitably facilitate the overcoating process.

In an exemplary implementation, the print head 38 may be packaged serially and reside at alternate height distance from the media, e.g., the document or substrate 44.

As illustrated in FIG. 1, down path of the print array 34 is an Ultraviolet ("UV") exposure unit or light source device 48. In printers using UV curable inks, the light source may be a mercury vapor lamp or UV light emitting diodes (UV LEDs).

As further illustrated in FIG. 1, the modular marking subsystem 10 is provided with a system controller 50. The system controller 50 communicates with the full width array scanning device 20, print bar marking module 34, UV exposure unit 48, and the subsystem conveying the document or substrate 44 through the modular marking subsystem 10. The controller 50 includes a suitable amount of memory (not shown) and a processor (not shown). The controller 50 is responsible for controlling the speed of the document or substrate 44 travelling through the modular marking subsystem 10, controlling the operations of the print bar marking module 34, and controlling the operations of the UV exposure unit 48.

As will be discussed in further detail below, the controller 50 uses information (scan data) from the full width array scanning device 20 to control both the firing of print nozzles 40 as well as the turning ON and OFF of the UV exposure unit 48 to cure ink dispensed by the nozzles 40 onto the rendered image 42.

More specifically, the controller 50 controls the print bar marking module 34 to overcoat a rendered image 42 on a document or substrate 44, whether the rendered image 42 is formed with a direct-ink-to-paper process or a xerographic-marking process.

Figure 3:
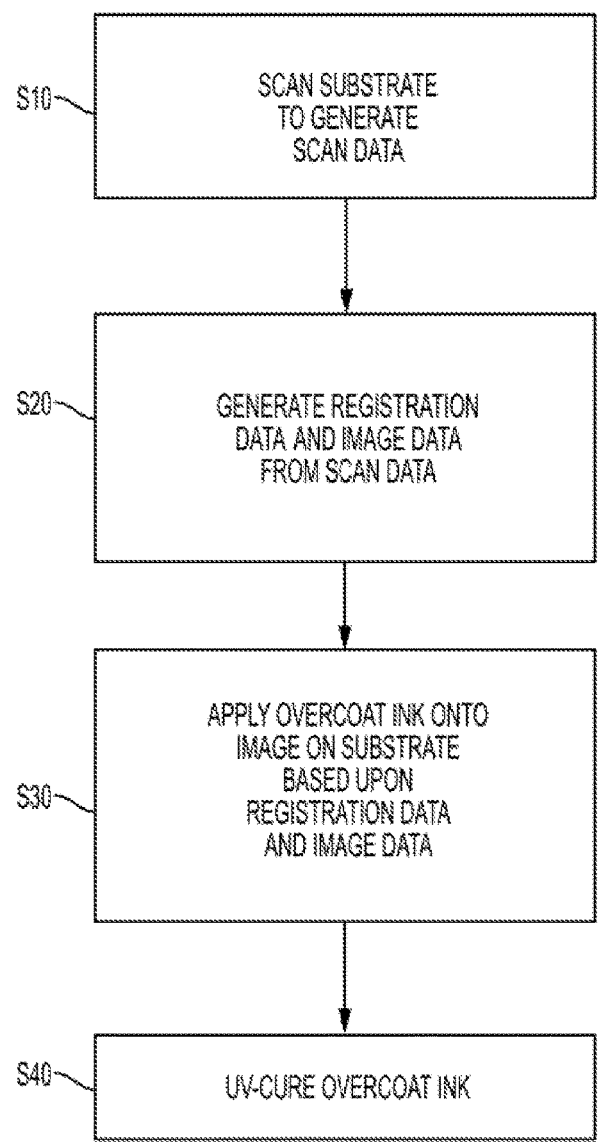
FIG. 3 is a flow chart illustrating a process for overcoating of a rendered print.

FIG. 3 illustrates an exemplary process for implementing an overcoating technique with the modular marking subsystem 10 of FIG. 1.

In practice one or more substrates, each including a rendered image, may be introduced at a front end of modular marking subsystem 10 by an inserter or a conventional document feeder.

Referring still to FIGS. 1 and 3, a "print" (i.e., the document or substrate 44 including the rendered image 42) is transported to the full width array scanning device 20, where scanning of the print is executed, at step S10. As a result of the scanning at step S10, scan data is captured from the document or substrate 44 including the rendered image 42.

The scan data represents the intensity of the light reflected from either the background of the scanning station, light reflected from the document or substrate 44, or the light reflected from the rendered image 42.

If the full width array scanning device 20 is a color scanning device, the scan data would be conventionally represented by RGB data. If the full width array scanning device 20 is a black/white scanning device, the scan data would be conventionally represented by black/white data or gray scale data.

In turn, registration data, wherein registration data may be data representing the location of a leading edge of the document or substrate 44 with respect to the full width array scanning device 20, is derived by the controller 50 or a processor within the full width array scanning device 20, at step S20, from the scan data.

In one example, the full width array scanning device 20 may employ a media path sensor (not shown) to generate a position signal representing the leading edge of the document or substrate 44, the position signal being transmitted to the controller 50 for use in the overcoating technique.

Registration data may also be obtained with a reflexive system as the document or substrate 44 is being transported along the document path 24 in the process direction.

For example, the reflexive system, as employed, for instance, in the Xerox™ Cipress printing press, could communicate with the controller 50 and be implemented by using sensors (not shown) disposed along the side(s) of and in the path of the document path 24. The reflexive system detects a lateral position of the document or substrate 44 along the document path 24, and at least one of a leading edge and a trailing edge of the document or substrate 44.

Also, at step S20, data representing background color (color of the substrate 44) is determined by the controller 50 or a processor within the full width array scanning device 20.

The background color may be determined using any conventional process known to those skilled in the art.

For example, the controller 50 or processor within the full width array scanning device 20 may analyze a predetermined number of scanlines, after the detection of the leading edge of the document or substrate 44, which are located at a leading edge portion of the document or substrate 44, by creating a histogram of image values of the scanned data to identify the background color (color of the document or substrate 44).

The determined background color is then compared with the acquired scan data to identify the rendered image 42 on the substrate 44.

For example, the image data value of the acquired scan data can be compared with the determined background color, and if the image data value of the acquired scan data is equal to or within a predetermined range of the determined background color, the acquired scan data is deemed to be representing the background (document or substrate).

On the other hand, if the image data value of the acquired scan data is not equal to and outside a predetermined range of the determined background color, the acquired scan data is deemed to be representing the rendered image.

When the determined background color is established as being a range of image data values, wherein the determined background color is the image data value in the center of the range, the determination process can allow for contrast reconciliation.

If a unit of scan data has an image value outside the range of image data values, the unit of scan data is determined to be a part of the rendered image 42. On the other hand, if a unit of scan data has an image value inside or equal to the limits of the range of image data values, the unit of scan data is determined to be a part of the substrate 44.

As can be readily appreciated by those skilled in the art, the controller 50 may be provided with suitable image processing software for assigning image data values to the scan data collected, via step S10. The image data values resulting from such assignment are then compared with the determined background value to differentiate the rendered image 42 from the substrate 44 so that the rendered image 42 can be appropriately overcoated and avoid overcoating the non-imaged substrate.

Accordingly, the area upon which overcoating is to be performed, namely the rendered image 42, is defined by identifying image data values that differ from the determined background color.

As noted above, the determined background color may be a range of image data values, such that the identification of the rendered image 42 is determined when the image data value of a unit of scan data differs from the determined background color by a predetermined amount.

Thereafter, the controller 50, via step S30, uses the identification of the rendered image 42 to control the firing of the nozzles 40 for dispensing a suitable amount of liquid material, such as a clear UV curable gel ink, on the rendered image 42.

Figure 4:
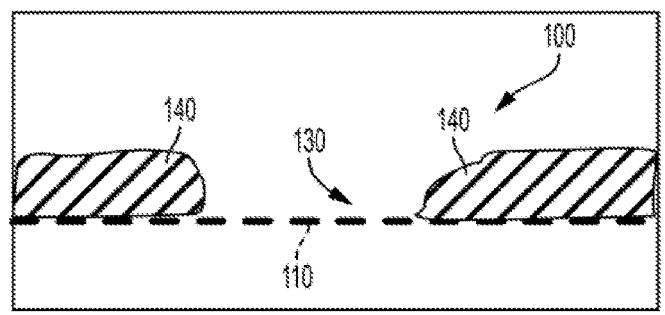
FIG. 4 is a cross-sectional view of a print medium with a partially imaged surface.
Figure 5:
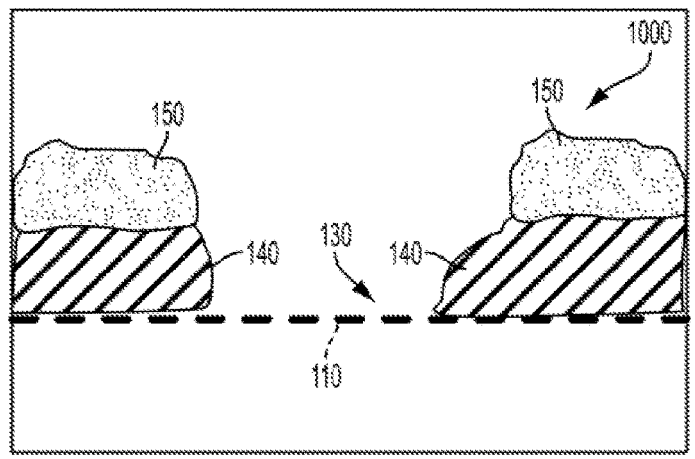
FIG. 5 is a cross-sectional view of a print medium with a partially imaged surface and an overcoat layer.

Referring to FIGS. 4 and 5, an example in which the rendered image is overcoated with an overcoating ink, such as a clear UV-curable ink, is shown.

As illustrated by FIG. 4, portions of the rendered image 140, which may be non-tactilely discernable or non-glossy, are disposed on the substrate 110. In the example of FIG. 4, a non-marked (non-rendered) area 130 exists between the rendered image portions 140 so that a contrast of colors between the background color of the substrate 110 and the rendered image portions 140 is noticeable.

It is noted that FIG. 4 shows that the rendered image portion 140 has a height with respect to the substrate 110. However, due to the limitations of the resolvability of human tactile sensing, the illustrated height of the rendered image portion 140 is not tactilely discernible by a human finger.

To realize a tactilely discernible rendered image portion 140, the rendered image portion 140 needs to be overcoated with additional marking materials that add enough height to the rendered image portion 140 to enable the rendered image portion 140 to be tactilely discernible.

FIG. 5 is an example of overcoating with additional marking materials that add enough height to the rendered image portion 140 to enable the rendered image portion 140 to be tactilely discernible As illustrated in FIG. 5, the rendered image portions 140 are shown as being overcoated with an overcoating ink 150.

It can be appreciated that drop placement of the overcoating ink is optimized when the resolution of the full width array scanner is suitably matched with the resolution of the marking module(s) applying the overcoating ink 150.

Additionally, the respective locations and boundaries of the portions of the rendered image 140 can be adequately determined when the resolution of the full width array scanner is as low as 300 spots per inch, particularly when the portions of the rendered image 140 being overcoated with overcoating ink 150 comprise text.

For maximum scanning flexibility, the full width array scanner may include a conventional programmable scan resolution feature or function to accommodate for scanning of finer detailed or delicate rendered images.

It is noted that finer detailed or delicate rendered images may include rendered images that include rendered structures (text, graphics, etc.) with a dimensional measurement that is less than 0.0033 inches (dimensional measurement of a spot corresponding to a resolution of 300 spots per inch), such as a dimensional width less than 0.0033 inches or a dimensional height less than 0.0033 inches.

For example, if the portion of the rendered image includes a Kanji character, a higher scanning resolution may be needed to capture the fine detail of the Kanji character.

Thus, a scanning system, having a programmable scan resolution feature or function capable of scanning at a resolution greater than 300 spots per inch, can be programmed or "instructed" to scan the document at a resolution greater than 300 spots per inch, to appropriately capture the Kanji character.

As illustrated in FIG. 1, a clear ink drop 15 is dispensed onto the rendered image 42. It should be recognized that the size of drop 15 can be responsively (dynamically) adjusted to the area of the rendered image 42 being inked, by changing the amount of heat employed in dispensing the drop.

Alternatively, the height of the pile associated with drop 15 can be increased by dispensing another drop of clear ink on the previously dispensed drop 15 by another print bar marking module (not shown) disposed downstream of the print bar marking module 34.

After a desired amount of clear ink is dispensed for overcoating the rendered image 42, the UV exposure unit 48 is used, via step S40, for curing the overcoated rendered image.

It is noted that by obtaining registration information dynamically with the full width array scanner 20, which full width array scanner 20 is in the document path 24 as the print bar marking module 34, the downstream system components, including the print bar marking module 34, the controller 50, and the UV exposure device 48 are readily provided with all of the information required to quickly and accurately overcoat a rendered image 42 disposed on the document or substrate 44.

It is further noted that the modular marking subsystem 10 allows for its use as an inline module or standalone unit. The standalone unit may utilized as a kiosk in a commercial print shop setting.

For example, a customer could insert rendered xerographic prints, such as wedding invitations, into the front end of a standalone modular marking system 10 and receive an overcoated product at the back end of the standalone marking system.

It also noted that the overcoating process above can be utilized to create a textured pattern on the rendered image, such as embossing or other related textured printing applications, such as ADA signage (Braille).

In a configuration wherein the modular marking system 10 is part of a larger printing system, the initial rendering of the image on the substrate may include the rendering of a clear marking material as a boundary around the non-clear marking material.

Figure 6:
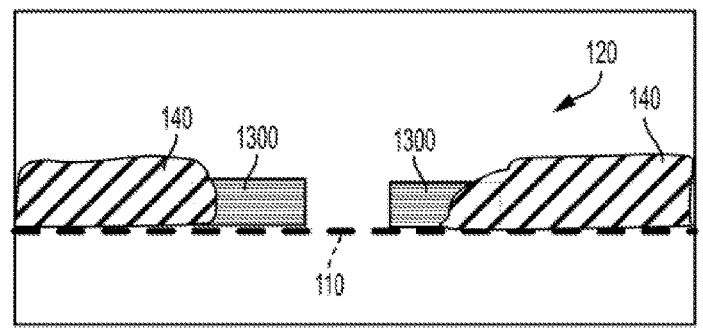
FIG. 6 is a cross-sectional view of a print medium with a partially imaged surface with a clear rendered boundary.

As illustrated in FIG. 6, a clear marking material bounded rendered image 120 includes a substrate 110. The substrate 110 has formed thereon a rendered image 140 of non-clear marking material surrounded by a boundary of rendered clear marking material 1300.

It is noted that the boundary of the rendered clear marking material 1300 would not be considered as part of the rendered image 140 during the overcoating process because the area associated with the rendered clear marking material 1300 would take on the color characteristics of the substrate 110, thereby being identified in the overcoating process as background color or the substrate 110.

It is noted that FIG. 6 shows that the rendered image portion 140 has a height with respect to the substrate 110 and the rendered clear marking material 1300. However, due to the limitations of the resolvability of human tactile sensing, the illustrated height of the rendered image portion 140 is not tactilely discernible by a human finger.

To realize a tactilely discernible rendered image portion 140, the rendered image portion 140 needs to be overcoated with additional marking materials that add enough height to the rendered image portion 140 to enable the rendered image portion 140 to be tactilely discernible.

Figure 8:
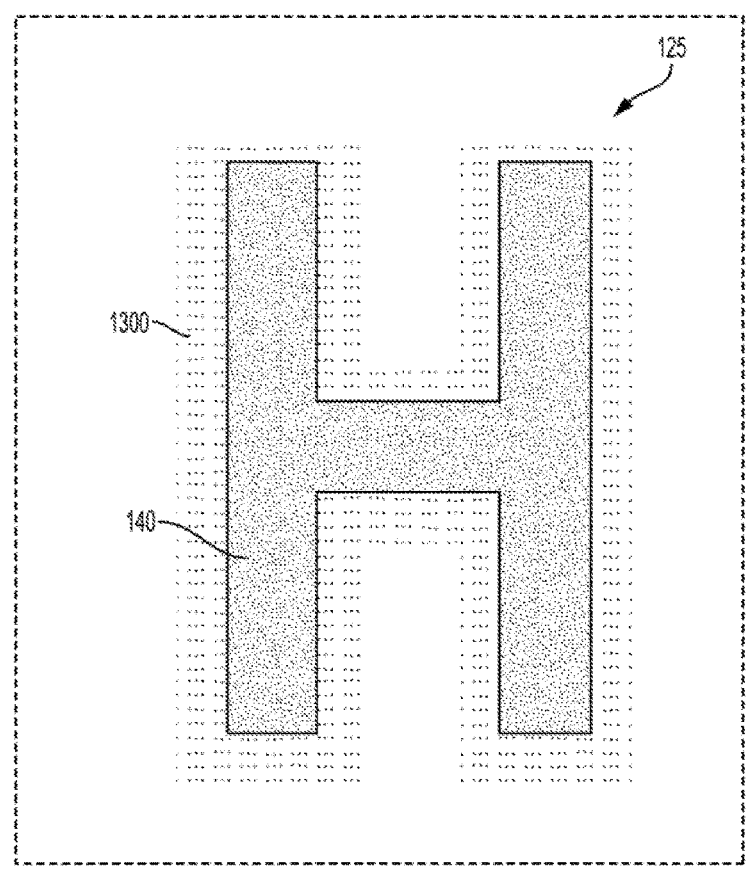
FIG. 8 is a top view of a print medium with an imaged surface with a clear rendered boundary.

FIG. 8 illustrates a more detailed view of a clear marking material bounded rendered image 125. As illustrated in FIG. 8, the clear marking material bounded rendered image 125 includes a rendered image 140 bounded by rendered clear marking material 1300.

The inclusion of the rendered clear marking material 1300 to bound the rendered image 140 addresses the issue of the overcoating ink seeping or spilling over onto the substrate 110.

Figure 7:
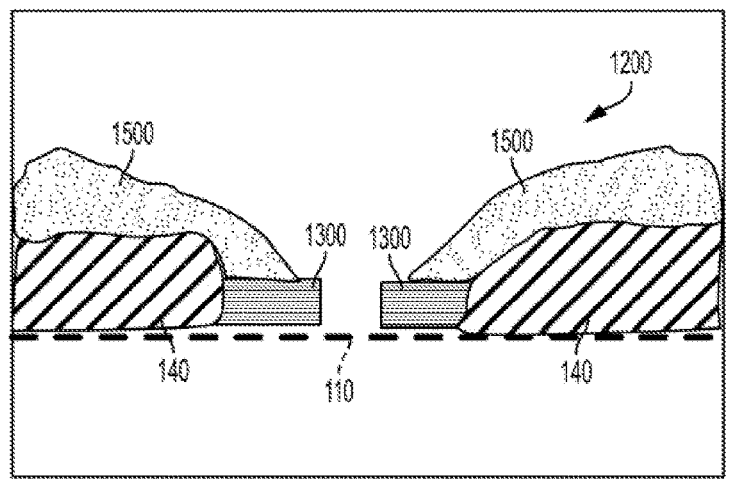
FIG. 7 is a cross-sectional view of a print medium with a partially imaged surface with a clear rendered boundary and a seeping overcoat layer.

More specifically, as illustrated in FIG. 7, in the rendered image 1200, the overcoating ink 1500 has seeped or spilt over from the rendered image 140 onto the rendered clear marking material 1300. In this situation, the rendered clear marking material 1300 protects the overcoating ink 1500, prior to rendering, from undesirably interacting with the substrate 110. In other words, the rendered clear marking material 1300 acts as run-off area for collecting the seeped or spilt overcoating ink 1500.

Figure 9:
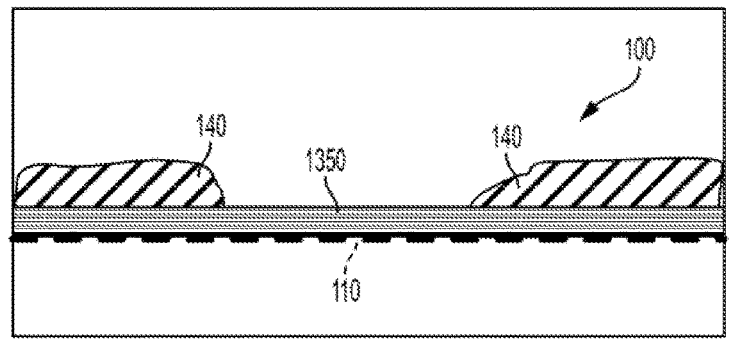
FIG. 9 is a cross-sectional view of a coated print medium with a partially imaged surface.

It is noted, as illustrated in FIG. 9, the rendered image 100 may be formed on a substrate 110 coated with a clear material 1350 that seals the substrate 110 from with seeped or spilt overcoating ink 1500.

It is noted that FIG. 9 shows that the rendered image portion 140 has a height with respect to the substrate 110 and the clear material 1350. However, due to the limitations of the resolvability of human tactile sensing, the illustrated height of the rendered image portion 140 is not tactilely discernible by a human finger.

To realize a tactilely discernible rendered image portion 140, the rendered image portion 140 needs to be overcoated with additional marking materials that add enough height to the rendered image portion 140 to enable the rendered image portion 140 to be tactilely discernible.

Figure 10:
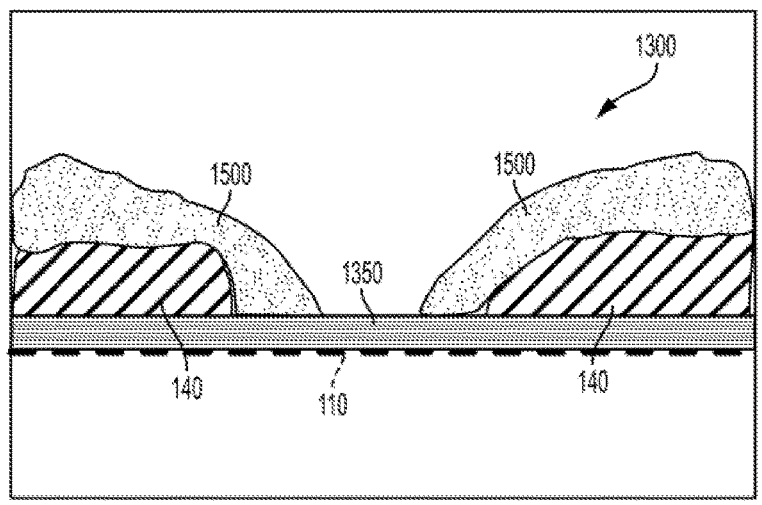
FIG. 10 is a cross-sectional view of a coated print medium with a partially imaged surface and a seeping overcoat layer.

As illustrated in FIG. 10, the clear material 1350 protects the overcoating ink 1500, prior to rendering, from undesirably interacting with the substrate 110. In other words, the rendered clear material 1350 acts as a shield or barrier for preventing the seeped or spilt overcoating ink 1500 from undesirably interacting with the substrate 110.

It is noted that the clear material 1350 may be formed by initially applying clear marking material over the entire substrate prior to applying marking material forming the rendered image.

Figure 11:
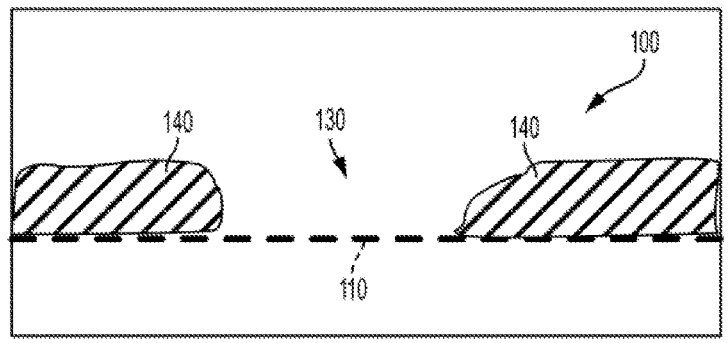
FIG. 11 is a cross-sectional view of a print medium with a partially imaged surface.
Figure 12:
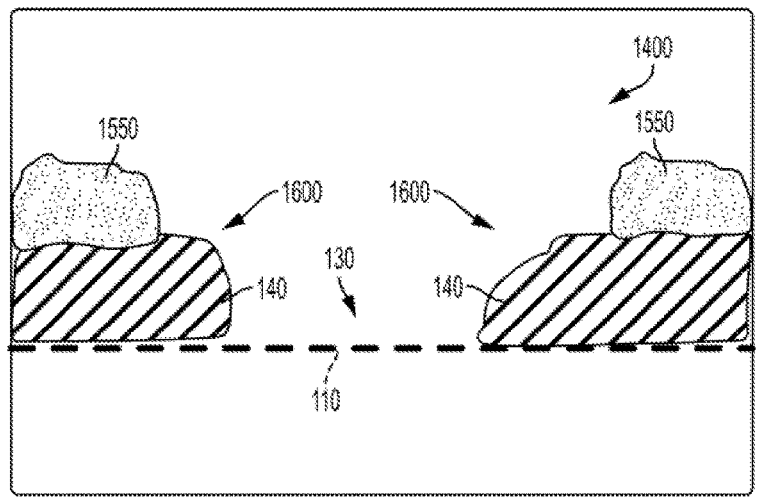
FIG. 12 is a cross-sectional view of a print medium with a partially imaged surface and a clipped overcoat layer.

FIGS. 11 and 12 illustrated another embodiment for protecting the overcoating ink, prior to rendering, from undesirably interacting with the substrate.

As illustrated by FIG. 4, portions of the rendered image 140, which may be non-tactilely discernable or non-glossy, are disposed on the substrate 110.

In the example of FIG. 11, a rendered image 100 includes a non-marked (non-rendered) area 130, which exists between the rendered image portions 140, so that a contrast of colors between the background color of the substrate 110 and the rendered image portions 140 is noticeable.

It is noted that FIG. 11 shows that the rendered image portion 140 has a height with respect to the substrate 110. However, due to the limitations of the resolvability of human tactile sensing, the illustrated height of the rendered image portion 140 is not tactilely discernible by a human finger.

To realize a tactilely discernible rendered image portion 140, the rendered image portion 140 needs to be overcoated with additional marking materials that add enough height to the rendered image portion 140 to enable the rendered image portion 140 to be tactilely discernible.

As illustrated in FIG. 12, in the rendered image 1400, the overcoating ink 1550 is "clipped" to create a boundary area 1600 over the rendered image portion 140. More specifically, the clipped overcoating ink 1550 covers an area less than an entire area of the area of the rendered image (the area of the marking material).

The "clipping" prevents any seeping or spilling over of the overcoating ink 1550 from reaching the edge of the rendered image portion 140, thereby preventing the overcoating ink 1550, prior to rendering, from undesirably interacting with the substrate 110.

The clipping can be realized by processing the identified image data, representing the rendered image, to clip a predetermined portion of the image data being sent to the print bar marking module 34, thereby creating the boundary area 1600.

The disclosed embodiments include an apparatus for overcoating a rendered image on a substrate with a liquid material. The apparatus includes a movable transport member for moving the rendered image on the substrate; a scanning device for scanning the substrate including the rendered image to acquire scan data; a controller, operatively connected to the scanning device, to generate registration data and image data from the scan data; and a marking module, operatively connected to the controller and located downstream from the scanning device, the marking module overcoating the rendered image on the substrate with the liquid material in response to registration data and the image data being communicated from the controller to the marking module.

The scanning device may comprise a full width array scanning device extending over at least a portion of the movable transport member.

The marking module may dispense liquid material in the form of ink drops, and the controller may control the dispensing of the liquid material by the marking module based upon the determined registration data and the determined image data to insure accurate placement upon the rendered image.

The liquid material may comprise a clear UV curable gellant ink.

The apparatus may comprise a UV curing device, disposed downstream of the marking module, for curing the clear UV curable gellant ink disposed on and the rendered image.

The rendered image on the substrate may be rendered by a xerographic process prior to scanning the rendered image with the scanning device.

The rendered image on the substrate may include silicone oil, wherein the rendered image is overcoated with a clear UV curable gellant ink adapted to adhere to the rendered image including silicone oil.

The scanning device, the marking subsystem, the movable transport, and the controller may be part of a standalone unit such that the substrate including the rendered image is supplied to the full width array scanning device at a standalone unit front end and is delivered, as output, with the rendered image overcoated with a clear UV curable gellant ink, at a standalone unit back end.

The controller may determine a background color of the substrate and determines the image data representing the rendered image on the substrate from the scan data based upon a comparison of the determined background color of the substrate and the scan data.

The disclosed embodiments further include a method for overcoating a rendered image on a substrate with a liquid material. The method includes (a) supplying a substrate including a rendered image to a scanning device, wherein the scanning device is disposed upstream of a marking module; (b) scanning the substrate including the rendered image, with the scanning device, to acquire scan data; (c) generating registration data from the scan data; (d) generating image data representing the rendered image on the substrate from the scan data; (e) communicating the registration data and the image data to the marking module; (f) moving the substrate including the rendered image from the scanning device to position the rendered image on the substrate under the marking subsystem; and (g) responsive to receiving the registration data and image data from the controller at the print module, overcoating the rendered image on the substrate with liquid material from the print module.

The scanning may use a full width array scanning device to scan the substrate including the rendered image.

The method may comprise (i) controlling the dispensing of drops of the liquid material by the marking module based upon the generated registration data and the generated image data to insure accurate placement of the drops upon the rendered image.

The liquid material may comprise a clear UV curable gellant ink.

The method may comprise (j) UV curing the clear UV curable gellant ink.

The rendered image on the substrate may have been rendered by a xerographic process.

The rendered image on the substrate may include silicone oil, wherein the overcoating of the rendered image with a clear UV curable gellant ink is adapted to adhere to the rendered image.

A background color of the substrate may be determined such that the image data representing the rendered image on the substrate from the scan data is determined based upon a comparison of the determined background color of the substrate and the scan data.

The disclosed embodiments yet further include an apparatus for overcoating a rendered image on a substrate with a clear UV curable gellant ink, the clear UV curable gellant ink being dispensable in the form of ink drops, the rendered image being rendered by a xerographic marking process, and the rendered image including silicone oil, includes: a movable transport member for moving a substrate including a rendered image; a scanning device for scanning the substrate including the rendered image to acquire scan data; a controller, operatively connected to the scanning device, to generate registration data and image data from the scan data; and a marking module, operatively connected to the controller and located downstream of the scanning device, the marking module overcoating the rendered image on the substrate with the clear UV curable gellant ink in response to registration data and the image data received from the controller.

The controller may determine a background color of the substrate and determines the image data representing the rendered image on the substrate from the scan data based upon a comparison of the determined background color of the substrate and the scan data.

It will be appreciated that various of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. An apparatus for overcoating a substrate, the substrate having image rendered regions representing areas of the substrate having an image rendered thereon and non-image regions representing areas of the substrate having no image rendered thereon, with a liquid material, comprising:
    a movable transport member for moving the substrate;
    a scanning device for scanning the substrate and an area around the substrate to acquire scan data;
    a controller, operatively connected to said scanning device, for generating, from said scan data, image data, said image data including rendered image data corresponding to image rendered regions representing areas of the substrate having the image rendered thereon and non-rendered image data corresponding to non-image regions representing areas of the substrate having no image rendered thereon;
    said controller generating, from said scan data, registration data, said registration data corresponding to a location of a boundary between the substrate and the area around the substrate; and
    a marking module, operatively connected to said controller and located downstream of said scanning device, to create tactilely discernible image rendered regions;
    said marking module overcoating the image rendered regions on the substrate with the liquid material in response to registration data and the image data received from the controller to create tactilely discernible image rendered regions;
    said marking module not overcoating the non-image regions on the substrate with the liquid material in response to registration data and the image data received from the controller to create tactilely discernible image rendered regions.

2. The apparatus of claim 1, wherein said scanning device comprises a full width array scanning device extending over at least a portion of said movable transport member.

3. The apparatus of claim 1, wherein said marking module dispenses liquid material in the form of ink drops;
    said controller controlling the dispensing of the liquid material by the marking module based upon the determined registration data and the determined image data to insure accurate placement upon the image rendered regions on the substrate and accurate non-placement upon the non-image regions on the substrate.

4. The apparatus of claim 1, wherein the liquid material comprises a clear UV curable gellant ink.

5. The apparatus of claim 4, further comprising:
    a UV curing device, adjacent to said marking module and aligned with both said scanning device and said marking module, for curing the clear UV curable gellant ink disposed on image rendered regions on the substrate.

6. The apparatus of claim 4, in which the image rendered regions on the substrate includes silicone oil, wherein the image rendered regions is overcoated with a clear UV curable gellant ink adapted to adhere to the image rendered regions including silicone oil.

7. The apparatus of claim 1, wherein the image rendered regions on the substrate are rendered by a xerographic process prior to scanning the substrate with said scanning device.

8. The apparatus of claim 1, wherein said scanning device, said marking subsystem, said movable transport, and said controller are part of a standalone unit such that the substrate, including the image rendered regions, is supplied to said full width array scanning device at a standalone unit front end and is delivered, as output, with the image rendered regions on the substrate overcoated with clear UV curable gellant ink, at a standalone unit back end.

9. The apparatus of claim 1, wherein said controller determines a background color of the substrate and determines said image data representing the image rendered regions on the substrate from the scan data based upon a comparison of the determined background color of the substrate and the scan data.

10. A method for overcoating a substrate, the substrate having image rendered regions representing areas of the substrate having an image rendered thereon and non-image regions representing areas of the substrate having no image rendered thereon, with a liquid material, comprising:
    (a) supplying the substrate to a scanning device, wherein the scanning device is disposed upstream of a marking module;
    (b) scanning the substrate and an area around the substrate, with the scanning device, to acquire scan data;
    (c) generating registration data from the scan data, the registration data corresponding to a location of a boundary between the substrate and the area around the substrate;
    (d) generating, from the scan data, image data, the image data including image data corresponding to image rendered regions representing areas of the substrate having the image rendered thereon and non-image data corresponding to non-image regions representing areas of the substrate having no image rendered thereon;
    (e) communicating the registration data and the image data to the marking module;
    (f) moving the substrate from the scanning device to position the substrate under the marking module;

(g) responsive to received registration data and image data, overcoating the image rendered regions on the substrate with liquid material from the marking module to create tactilely discernible image rendered regions; and (h) responsive to received registration data and image data, not overcoating the non-image regions on the substrate with the liquid material from the marking module to create tactilely discernible image rendered regions.

11. The method of claim 10, wherein said scanning uses a full width array scanning device to scan the substrate and the area around the substrate.

12. The method of claim 10, further comprising:
(h) controlling the dispensing of drops of the liquid material by the marking module based upon the derived registration data and the determined image data to insure accurate placement upon the image rendered regions on the substrate and accurate non-placement upon the non-image regions on the substrate.

13. The method of claim 12, wherein the liquid material comprises a clear UV curable gellant ink.

14. The method of claim 13, further comprising:
(i) UV curing the clear UV curable gellant ink.

15. The method of claim 10, wherein the image rendered regions on the substrate have been rendered by a xerographic process.

16. The method of claim 15, wherein the image rendered regions on the substrate includes silicone oil, wherein said overcoating of the image rendered regions is with a clear UV curable gellant ink adapted to adhere to the image rendered regions.

17. The method of claim 10, further comprising:
(i) determining a background color of the substrate;
said determining the image data representing the image rendered regions on the substrate from the scan data being based upon a comparison of the determined background color of the substrate and the scan data.

18. An apparatus for overcoating the substrate, the substrate having image rendered regions representing areas of the substrate having an image rendered thereon and non-image regions representing areas of the substrate having no image rendered thereon, with a clear UV curable gellant ink, the clear UV curable gellant ink being dispensable in the form of ink drops, the image being rendered by a xerographic marking process, and the image rendered regions including silicone oil, comprising:

a movable transport member for moving the substrate;
a scanning device for scanning the substrate and an area around the substrate to acquire scan data;
a controller, operatively connected to said scanning device, for generating, from said scan data, image data, said image data including image data corresponding to image rendered regions representing areas of the substrate having the image rendered thereon and non-rendered image data corresponding to non-image regions representing areas of the substrate having no image rendered thereon;
said controller generating, from said scan data, registration data, said registration data corresponding to a location of a boundary between the substrate and the area around the substrate; and
a marking module, operatively connected to said controller and located downstream of said scanning device, to create tactilely discernible image rendered regions;
said marking module overcoating the image rendered regions on the substrate with the clear UV curable gellant ink in response to registration data and the image data received from the controller to create tactilely discernible image rendered regions;
said marking module not overcoating the non-image regions on the substrate with the clear UV curable gellant ink in response to registration data and the image data received from the controller to create tactilely discernible image rendered regions.

19. The apparatus of claim 18, wherein said controller determines a background color of the substrate and determines said image data representing the image rendered regions on the substrate from the scan data based upon a comparison of the determined background color of the substrate and the scan data.

* * * * *